Jan. 29, 1952     G. C. SEAVEY ET AL     2,584,053
MEANS FOR THE APPLICATION OF ALTERNATING SHEAR AT
SONIC FREQUENCIES TO THE TREATMENT OF MATERIAL
Filed Nov. 28, 1949     3 Sheets-Sheet 2
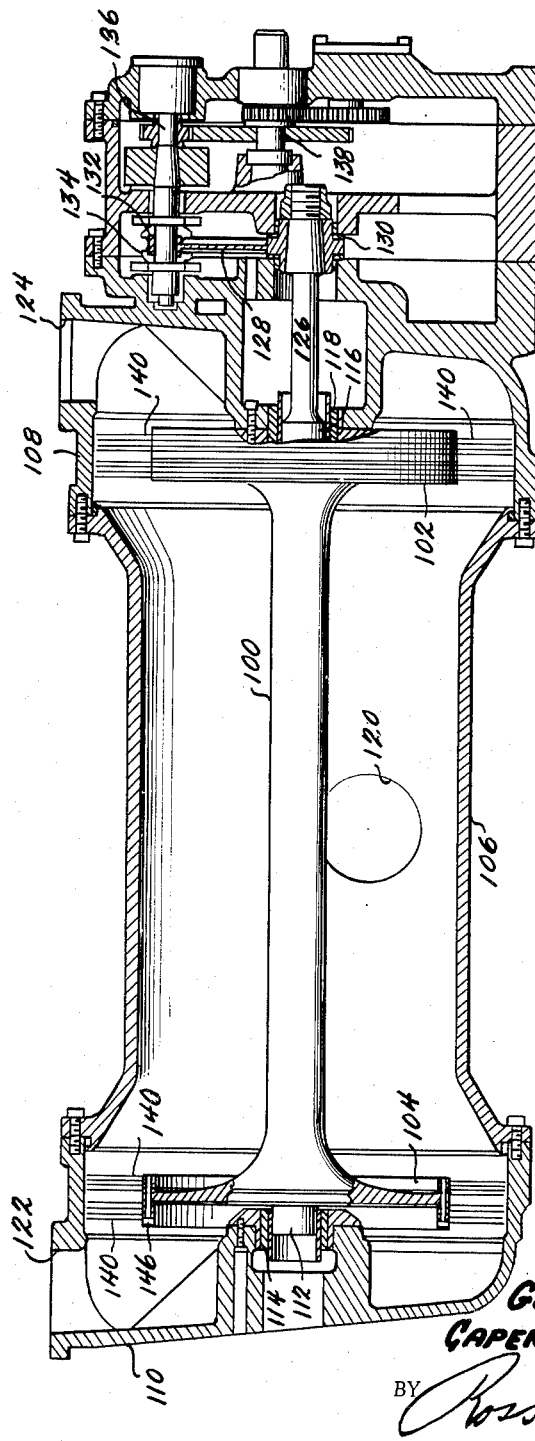
INVENTORS
*GORDON C SEAVEY*
*CAPERTON B. HORSLEY*
BY
ATTORNEY Jan. 29, 1952 G. C. SEAVEY ET AL 2,584,053
MEANS FOR THE APPLICATION OF ALTERNATING SHEAR AT
SONIC FREQUENCIES TO THE TREATMENT OF MATERIAL
Filed Nov. 28, 1949 3 Sheets-Sheet 3
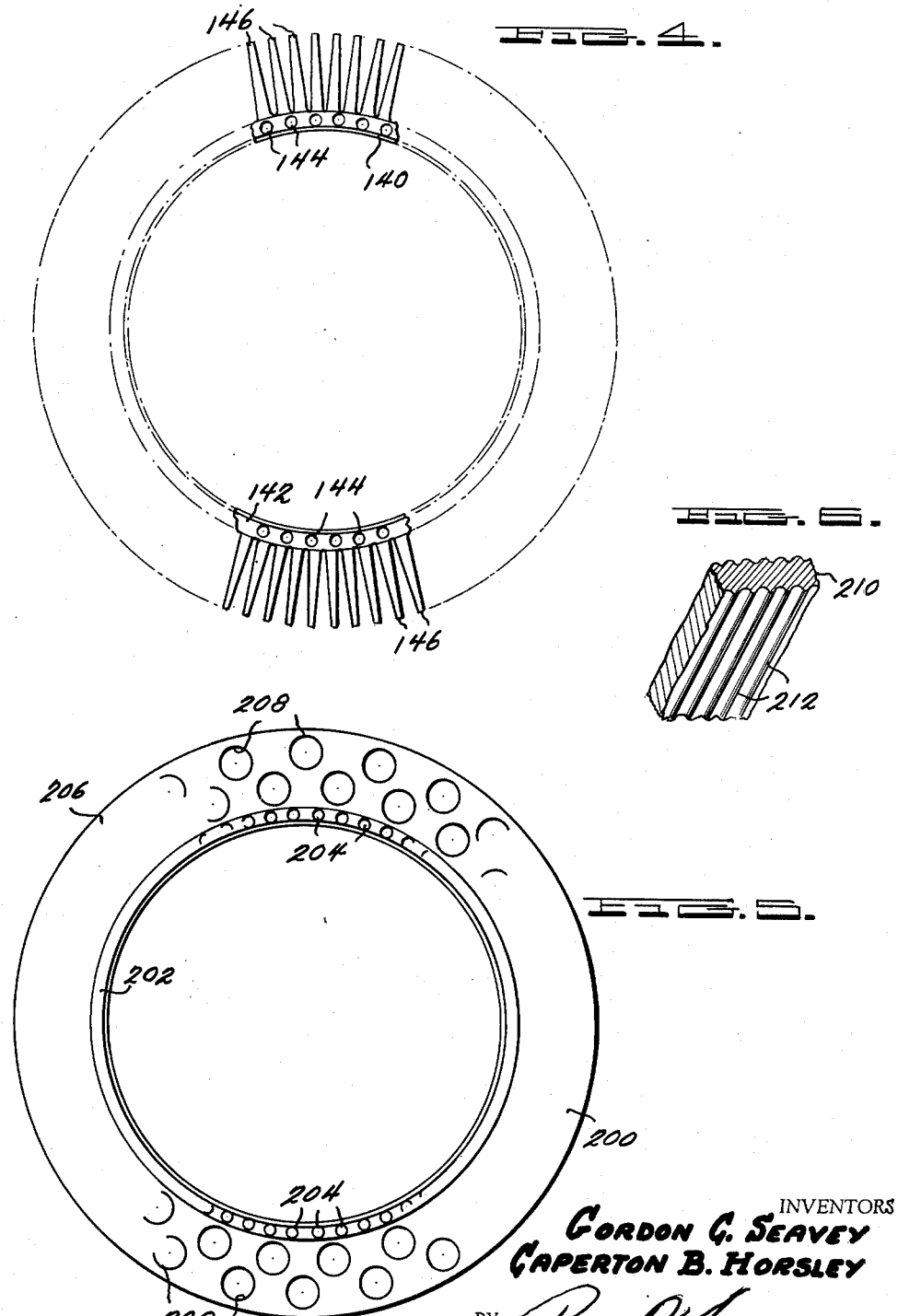
INVENTORS
GORDON C. SEAVEY
CAPERTON B. HORSLEY
BY
ATTORNEY Patented Jan. 29, 1952

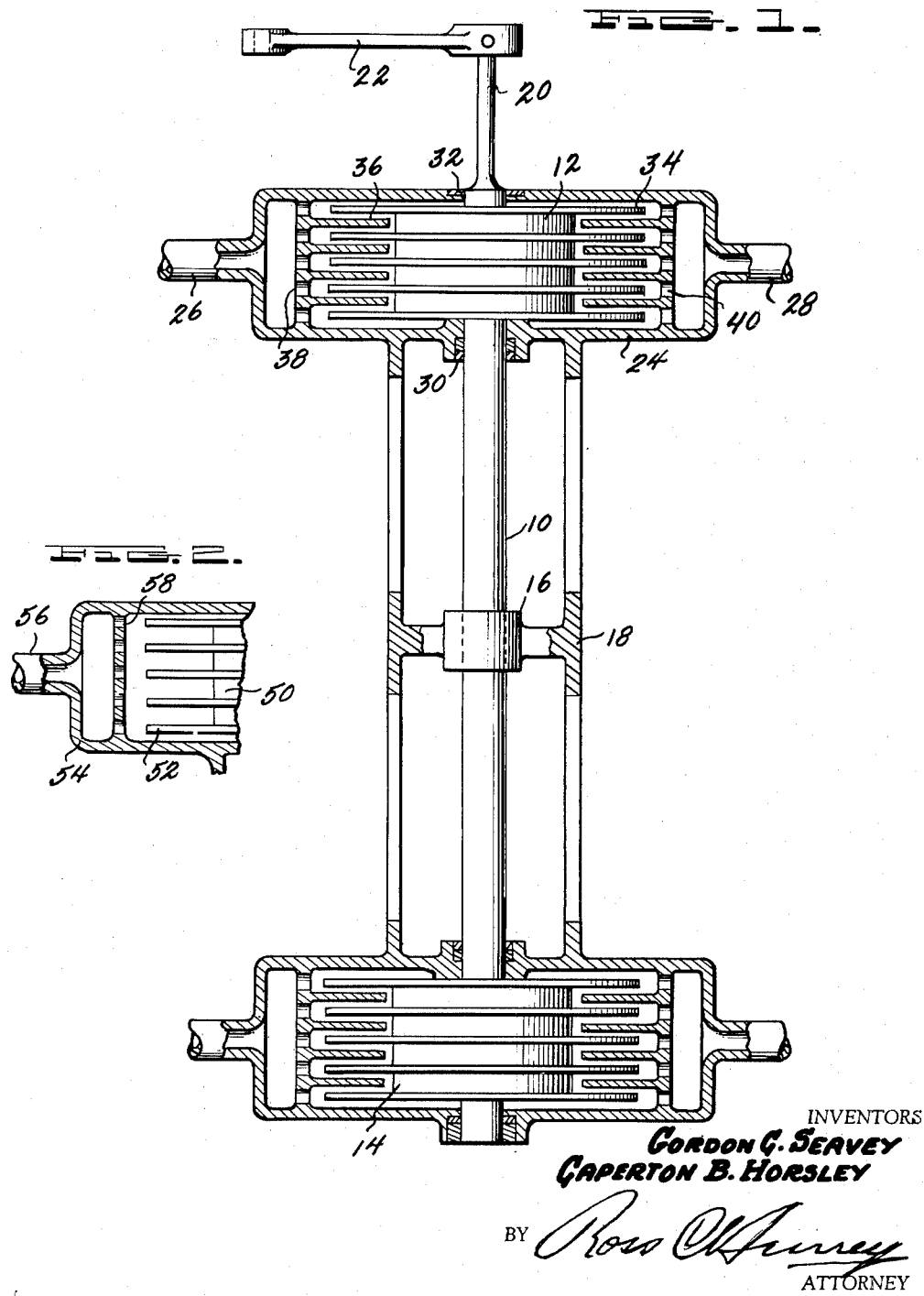

2,584,053

UNITED STATES PATENT OFFICE 2,584,053

MEANS FOR THE APPLICATION OF ALTERNATING SHEAR AT SONIC FREQUENCIES TO THE TREATMENT OF MATERIAL

Gordon C. Seavey, Arlington, and Caperton B. Horsley, Westwood, Mass., assignors to Sonic Research Corporation, Boston, Mass., a corporation of Massachusetts Application November 28, 1949, Serial No. 129,786

16 Claims. (Cl. 259—4)

It is a primary object of this invention to provide means for the application, to the treatment of liquids, emulsions, hydrosols, slurries and other mixtures, of alternating shear forces of substantial amplitude and at frequencies at least within the audible range.

It is a further object of this invention to provide means as aforesaid adapted to treat large volumes of the materials aforesaid at substantial consistencies and viscosities.

It is a further object of this invention to provide means as aforesaid of high mechanical efficiency in which most of the input power is expended directly upon the material being treated.

The above and other objects will be made clear from the following detailed description taken in connection with the annexed drawings, in which:

Figure 1 is a section through a vibrator for producing alternating shear;

Figure 2 is a similar, partial section of a modification of Figure 1;

Figure 3 is a section through a machine utilizing alternating shear, the flow of the material under treatment being normal to the direction of vibration;

Figure 4 is a detail of one of the operating elements of Figure 3;

Figure 5 is a modification of the form shown in Figure 4; and

Figure 6 is a detail showing an optional modification of the operating elements of all three machines.

When a material is subjected to sound or vibration, it is subjected to alternating pressure and/or alternating acceleration. Where there is alternating acceleration there is, of course, a periodic displacement of the material, which is generally referred to as particle displacement. If a fluid material in a solid container is subjected to sound or vibration, that portion of the fluid which is close to the walls of the solid container which are generally parallel to the direction of the particle displacement in the fluid will be subjected to alternating shear, since the fluid touching the wall will tend to move with the wall whereas the fluid a little further away from the wall will tend to move with the adjacent fluid. In all vibrating systems of the prior art, however, the generation of alternating shear, if it occurs at all, occurs as merely a minor incident to the generation of vibrations acting in alternating pressure and/or alternating acceleration.

We have found that for many classes of material and for many desired results alternating pressure and acceleration are ineffectual, while the alternating shear produces extraordinarily good results. Our problem, therefore, has been to arrive at a vibratory system in which the factor of alternating shear is enormously emphasized. The effect of such a system obviously is to obtain far more effective results for the same input power since it is employed in the creation of phenomena, almost none of which phenomena lack utility in the production of the desired results. This problem has been solved by creating a mechanical system of substantial mass designed to have a predetermined natural period of vibration, this vibrating mass being provided with material contacting surfaces designed to impart, almost exclusively, alternating shear to the fluid materials with which the surfaces come in contact. We have further provided a means for exciting the vibration of the system, which means is not subjected to the relatively large inertia forces incident to the vibration of the large mass of the system.

This invention will be discussed from two specific aspects without thereby in any way limiting the application of the invention to these two purposes. One purpose is the formation of dispersions of solids in liquids and the other is the fibrillation of wood pulp or similar fibers.

The objects of paper pulp refining are (1) fibrillation, that is, segregation of the pulp so far as possible into ultimate fibers, and for breaking some or all of the fibers into their component fibrilles which may or may not remain attached to the fiber, (2) rendering the fibers limp and tender and (3) hydration to swell the fibers. Various other actions of the refining processes have been recognized and discussed but the foregoing embrace by all odds the most important functions.

Both beaters and jordans accomplish fibrillation and both accomplish a certain amount of softening and tenderizing. The thinking in the paper industry is not unanimous but the weight of opinion is to the effect that hydration is attained almost exclusively in the beater and to little, if any, extent in the jordan. In fact majority opinion has it that where hydration is not a major requirement, beating may be dispensed with and the entire refining process may be carried out in the jordan and industrial practice is pretty much in accord with this opinion.

The instant invention contemplates securing, in a single type of treatment, all three of the above noted major effects together with most of the other collateral and subsidiary effects observed for either jordans or beaters and, so far as ordinary testing and microscopic examination thus far has revealed, all of these effects are obtained. Both the physical and mechanical structure of the cellulose molecule and of cellulosic fibers are still sufficiently unexplored so that any inventor operating in this field would be rash indeed to commit himself to any particular theory. Since, however, the application of alternating shear appears to accomplish primarily repeated flexing and reflexing of the fibers, it seems reasonable to suppose that it is such action, for whatever reason, which accomplishes results at least equal and frequently superior to the crushing, cutting and rubbing actions of conventional refining equipment.

There are three different ways of developing alternating shear. The first is to provide a stationary surface and a vibrating surface only slightly spaced from the stationary surface and to pass the material to be treated between the surfaces, the vibration being in the direction of the surfaces. The second is simply to provide one or more parallel surfaces vibrating in unison in the direction of the surfaces, and to pass the material between such surfaces, relying on the inertia of the material being treated to create alternating shear. The third is to provide vibrating blades, or openings in longitudinally vibrating surfaces, and to pass the material to be treated between the edges of such blades or openings.

Figure 1 illustrates the first of the methods just mentioned. Here the vibrational system comprises a torsion bar 10 having a drum 12 rigidly secured to it at one end and a drum 14 rigidly secured to the other end. The resiliency of the bar 10 and the mass or moment of inertia of the drums 12 and 14 are chosen to provide a predetermined natural frequency of vibration, the frequency being predetermined for the particular job the apparatus is designed to do. At the predetermined natural frequency, the frequency and amplitude of both drums will be equal but the phase will be exactly reversed, drum 12 rotating in a clockwise direction during the period of time that drum 14 rotates in a counter-clockwise direction and vice versa.

At its center the bar 10 is supported in a bearing 16 mounted in a housing 18. So far as frequency and amplitude are concerned, the bar 10 could be rigidly fixed in the bearing 16 and the drum 14 could be omitted. This is regarded as undesirable, however, since it would result in transmitting the vibrational forces to the frame 18. With the two-drum construction the system is balanced internally and the only vibrational forces communicated to the frame are through the bearings and through the material being treated. Such forces obviously are negligible.

The system is excited through a torsion bar 20 secured to one end of the main torsion bar 10. An arm 22 is secured to the free end of the exciting bar 20 and is oscillated by any suitable driving means. The torsion resistance of the exciter bar 20 is insufficient to strain the bearings of the exciter bar even were the inner end of the bar rigidly fixed.

When the driving means is starting and stopping, and thus operating at frequencies quite removed from the natural frequency of the system represented by torsion bar 10 and drums 12 and 14, most of the oscillatory rotational movement imparted to arm 22 will be absorbed by the flexing of exciting bar 20, but as the frequency of the driving means approaches the natural frequency of the system, the amplitude of the rotational movement of drums 12 and 14 will approach the amplitude of the rotational movement of arm 22. Thereafter the only power which the driving means need supply is to overcome the losses of the system such as bearing and hysteresis losses and the power actually applied to the material being treated. Were it desired, once the unit has attained its natural frequency, the unit could be driven directly to supply the losses aforesaid and the exciting bar 20 would be unnecessary.

The drum 12 is surrounded by a casing 24 secured to the frame 18 and having an inlet 26 and an outlet 28. The bar 10 enters the casing through a combination bearing and stuffing box 30 and the exciting bar 20 enters the casing through a similar bearing and stuffing box 32.

Mounted on the drum 12 are a number of discs 34 spaced axially of the drum. A number of annular rings 36 are formed in the casing 24 and lie between the discs 36 to define therewith narrow annular channels. Openings 38 are formed between the rings 36 adjacent the inlet 26 and openings 40 are formed between the rings 36 adjacent the outlet 28. A precisely similar arrangement of casing, discs and rings is provided adjacent the drum 14. Material flowing from the inlet 26 to the outlet 28 passes through the narrow channels defined between rings 36 and discs 34, while the discs 34 are oscillating at the predetermined frequency which, depending on the nature of the material and the desired result, may vary from 10 c. p. s. (cycles per second) to 50,000 c. p. s. The forces exerted upon the material obviously are almost exclusively forces of alternating shear.

The two dominant factors in determining the natural period of vibration of a system such as just described are the torsional resiliency of the shaft and the moment of inertia of the drum. Inasmuch as the moment of inertia is the product of mass times the square of the radius, a comparatively small change in mass at the extreme periphery of the oscillating member will make relatively large adjustments in the period of the system. Accordingly the frequency or period may be adjusted by bolting to the rims of the drums ring-like shims of any suitable metal which very materially alter the moment of inertia of the drums and, therefore, the frequency.

In Figure 2 is shown a drum 50 forming part of a system such as is shown in Figure 1. On this are mounted a plurality of discs 52. A casing 54 surrounds the drum and has an inlet 56. Openings 58 provide access for material coming through the inlet 56 to the discs 52. This construction applies shearing forces by utilizing the inertia of the material to be treated rather than proximity between an oscillating and a stationary surface. This form has its greatest value where materials of high consistency or viscosity are to be used since it greatly reduces the power necessary to force material through the machine.

In Figure 3 is disclosed an apparatus designed primarily to meet the problem of fibrillating and otherwise refining pulp and it will be described with that objective in view although it is to be understood that the apparatus is not limited to this particular purpose.

In all paper-making processes various treatments or combinations of treatments are resorted to for the mechanical refinement of the freshly produced pulp to a point where it is workable on paper machines. The most conventional of these treatments involves beaters and jordans, both of which instruments require an enormous expenditure of power. Most of this power, however, is utilized in heating the slurry and is wasted so far as mechanical refinement of the pulp is concerned.

We propose to treat an aqueous suspension of pulp fibers by the direct mechanical application of alternating shear forces, and such applications may be made at any point or points in the papermaking process at which refinement or fibrillation of the pulp becomes desirable.

A slurry of pulp often contains not only individual fibers but bundles of fibers and the bundles are of two different types. In one of these the fibers are twisted or matted or felted together and in the other the fibers are adhered together by some residual binder material from the original wood itself. In this latter case there may also be present in a bound or adhered bundle a certain amount of cohesion caused by felting or interweaving of the fibers. In any case whether an individual fiber or a bundle of fibers, alternating shear tends to flex and reflex the fibers or bundles. The single fibers are thereby softened and rendered pliable hence more amenable to the paper-making process, while the fibers composing the bundles tend to separate from each other. The same forces operating through flexure to separate a bundle of interfelted fibers operate to break the bonds or adhesions of bonded bundles and to separate these into their constituent fibers. The flexing, moreover, encourages the adsorption of water by the fibers, thus producing a swelling or hydration which is essential for the proper preparation of certain special paper-making stocks.

Unless as in Figure 1 the oscillating member is in close proximity to a stationary member the treatment is apt to be limited to a relatively thin lamina of material adjacent the oscillating surface. Such close proximity, however, reduces the channel through which the stock must pass and thus reduces the consistency of the slurry that can be handled. If the stock is passed in a direction normal to the oscillating surface obviously the opportunity for contact between the oscillating surface and the stock is much greater. The problem is met by the construction illustrated in Figures 3, 4 and 5, where the operating surfaces are comprised either of blades or of apertured discs. The space between the blades or the apertures of the disc permit the stock to flow axially through the machine.

The device comprises a torsion bar 100 having a drum 102 at one end and a drum 104 at the other. The mass of the drums, or rather the moment of inertia of the drums, combines with the torsional resiliency of the bar to produce a system having a predetermined period of vibration as described in connection with Figure 1. The torsion bar is surrounded by a shell 106 which is bolted to an end casing member 108 surrounding the drum 102 and an end casing member 110 surrounding the drum 104. A stub shaft 112 adjacent the drum 104 is supported in a bearing 114 formed in casing 110. A similar stub shaft 116 at the opposite end is mounted in a bearing 118 formed in the casing 108. A stock inlet 120 is formed centrally of the casing 106. Stock entering through the inlet 120 proceeds to both drums 104 and 102 and after passing by the drums emerges from casing 110 through an outlet 122 and from casing 108 through an outlet 124. A torsional exciter 126 is formed on the end of the stub shaft 116 and is secured to an arm 128 which is guided in a bearing 130. A connecting rod 132 connects the arm 128 with an eccentric 134 mounted on a shaft 136 driven by a gear train 138.

Bolted to the rims of drums 102 and 104 are a plurality of active material-treating members 146 which are best shown in Figure 4. These comprise base rings 142 having apertures 144 through which pass bolts 140 to secure members 146 to the rims of their respective drums. The members 140 are axially spaced along the drums and each has a series of blades 140 which taper from the base ring 142 to their free extremities.

The precise number, size and spacing of the blades 146 will depend on the type of material to be treated and the degree of treatment required. It has been found that the mean velocity of the blades, that is, four times the maximum displacement of the blade from its mean position, multiplied by the frequency, should not be less than about 100 feet per minute and that a mean velocity of about 400 feet per minute or more appears to be desirable in the sense that increasing the velocity beyond 400 feet per minute has relatively less effect in increasing the efficiency of the process. In short, an oscillating speed of less than 100 feet per minute has substantially zero efficiency. From 100 feet per minute to 400 feet per minute the efficiency increases very sharply. Above 400 feet per minute efficiency still increases but the rate of increase is lower than between 100 and 400 feet per minute. In the case of most pulps, speeds of 650 to 750 feet per minute seem to produce excellent results and efficiency. Precisely how far this speed may be increased with a profitable increase in efficiency cannot be fixed on any general basis since the requirements of each material being treated and the results desired to be obtained introduce so many variables that no generalization as to ultimate maximum speeds would be valid. It is mechanically possible to produce vibrational speeds of 10,000 feet per minute or more but whether, as a solution to any particular problem, such speeds would be commercially profitable from the standpoint of overall cost efficiency is difficult to predict. Certainly there are no theoretical reasons indicating that such speeds either would or would not be profitable from the efficiency standpoint though they may well be profitable, if not from the standpoint of straight mechanical efficiency, at least from the standpoint of accomplishing results not otherwise obtainable.

The mean velocity is computed as follows: assuming a displacement or amplitude of plus or minus .2 inches from center the total travel in a cycle is 4×.2 inches or .8 inches. Thus the mean velocity in feet per minute at an amplitude of plus or minus .2 inches and a frequency of 100 c. p. s. would be represented by $$\frac{100 \times 60 \times 4 \times .2}{12}$$

or 400 feet per minute. The efficiency of the unit under the conditions just stated appears to be substantially the same as for 180 c. p. s. and an oscillating movement of plus or minus .11 inches which also results in a velocity of 400 feet per minute. On the other hand an oscillating movement of plus or minus .11 inches at 100 c. p. s. resulting in a mean velocity of only 220 feet per minute will, with most pulps, increase the power required for the same degree of refinement by a factor of 3 or more.

It will be noted that in the form of Figures 3 and 4 the flow is substantially normal to the direction of oscillation of the blades. This results in all portions of the slurry being repeatedly subjected to the action of various blades with greater uniformity of treatment and greater effect of treatment at any given rate of flow. It is contemplated that in the treatment of most pulps the consistency of the pulp slurry will be optimum at between 2% and 5%.

Figure 5 shows an alternative form of disc for use with the device illustrated in Figure 3. In this form the disc 200 has a base 202 identical with the base ring 142 of Figure 4 and having apertures 204 for the purpose of securing it to the drums. The annular portion 206 is pierced by a plurality of apertures 208. The peripheries of these apertures define edges similar in effect to the spaces between arms 146 of Figure 4 and permit axial progress thereof precisely as in the case of the ring shown in Figure 4.

In Figure 6 there is shown a small section 210 of a form which may be given to any of the active members illustrated herein. In this case the members are provided with substantially radial grooves or slots 212 which serve to roughen the surface and increase the depth of material affected by the vibration of the surface.

While various specific forms have been illustrated and described herein it is not intended to limit this invention to any of the structural details herein shown but only as set forth in the subjoined claims which are to be broadly construed.

We claim:

1. Apparatus for treating material with intense alternating shear forces, comprising, in combination, a pair of members each of predetermined mass, at least one of said members having a treating surface adapted to contact said material, an elastic member connecting said first named members to each other to transmit motion from one to the other, the elasticity of said connecting member being correlated with the masses of said first named members to constitute therewith a system having a predetermined natural frequency of oscillation with said first named members oscillating with predetermined amplitudes at the same frequency but in opposite phase, resilient coupling means connected to one of the members of said system, mechanism for oscillating said coupling means at said predetermined frequency whereby to bring said system into oscillation at said frequency, and means for presenting material to be treated to said treating surface.

2. In apparatus for treating material with intense alternating shear forces the combination comprising a pair of drums each of predetermined mass, at least one of said drums having a material treating surface arranged to move therewith, a torsion bar connecting said drums to each other and coaxial therewith, the elasticity of said bar being correlated with the masses of said drums to constitute therewith a system having a predetermined natural frequency of rotational oscillation with said drums oscillating with predetermined amplitudes at the same frequency but in opposite phase, a resilient exciter bar connected to a member of said system, said exciter bar having substantially less elastic strength than said torsion bar, mechanism for oscillating said exciter bar at said predetermined frequency whereby to bring said system into rotational oscillation at said frequency, and means for presenting material to be treated to said treating surface.

3. Apparatus in accordance with claim 2 in which said treating surface is formed by radially extending material contacting elements.

4. Apparatus in accordance with claim 3 including a housing for the drum to which the said elements are attached, said housing having an inlet and an outlet to permit the passage therethrough of said material.

5. Apparatus in accordance with claim 4 in which said inlet and outlet are arranged to permit such passage of said material in a direction generally transverse to the direction of oscillation of said material contacting elements.

6. Apparatus in accordance with claim 3 including weights attachable to at least one of said drums for adjusting the natural frequency of oscillation of said system.

7. Apparatus for treating fluent materials with alternating shear forces which comprises a pair of members each of predetermined mass, a torsion bar connecting said members to each other, the masses of said members being so chosen having regard to the elasticity of said torsion bar that said members and bar together will constitute a resonant system having a predetermined natural frequency of rotational oscillation with said members oscillating with predetermined amplitudes at the same frequency but in opposite phase, a housing enclosing at least one of said members, an inlet and outlet in said housing permitting the flow therethrough of said material to be treated, material-contacting elements extending from the enclosed member for oscillation therewith, a resilient exciter connection in driving relation to one of the members of said system and having substantially less elastic strength than said torsion bar, and a driving device for oscillating said exciter connection at said natural frequency whereby to bring said system into resonant oscillation.

8. Apparatus in accordance with claim 7 in which said housing is provided with interior stationary projections extending between and closely adjacent to said material contacting elements.

9. Apparatus in accordance with claim 7 in which said material-contacting elements comprise a series of radially extending spaced parallel apertured discs.

10. Apparatus in accordance with claim 7 in which said material-contacting elements comprise a series of radially extending blades.

11. Apparatus in accordance with claim 7 in which the surfaces of said material-contacting elements are provided with a series of serrations extending generally transversely of the direction of oscillation.

12. Apparatus in accordance with claim 7 in which said natural frequency of oscillation is within the range of 10 to 50,000 cycles per second.

13. Apparatus in accordance with claim 7 in which the mean velocity of the radial edges of said material-contacting elements is above approximately 400 feet per minute.

14. Apparatus in accordance with claim 7 in which the said natural frequency of oscillation is above approximately 100 cycles per second and the mean velocity of the radial edges of said material-contacting elements is above approximately 400 feet per minute.

15. Apparatus in accordance with claim 7 in which said inlet and outlet are arranged to permit flow of said material in a direction generally transverse to the direction of oscillation of said elements.

16. Apparatus according to claim 7 including weights attachable to at least one of said members for adjusting said natural frequency of oscillation of said system.

GORDON C. SEAVEY.
CAPERTON B. HORSLEY.

REFERENCES CITED

The following references are of record in the file of this patent:

UNITED STATES PATENTS

| Number | Name | Date |
|---|---|---|
| 931,025 | Amend | Aug. 17, 1909 |
| 1,656,503 | Scherbaum | Jan. 17, 1928 |
| 1,705,162 | Wahl | Mar. 12, 1929 |
| 2,042,880 | Cornell | June 2, 1936 |
| 2,070,757 | Smith | Feb. 16, 1937 |
| 2,080,370 | Hauk | May 11, 1937 |
| 2,163,150 | Meissner | June 20, 1939 |
| 2,163,650 | Weaver | June 27, 1939 |
| 2,220,164 | List | Nov. 5, 1940 |
| 2,251,959 | Smith | Aug. 12, 1941 |
| 2,297,084 | Swallow | Sept. 29, 1942 |
| 2,302,983 | Swallow | Nov. 24, 1942 |
| 2,424,259 | Swallow | July 22, 1947 |
| 2,478,207 | Robinson | Aug. 9, 1949 |

OTHER REFERENCES

Mechanical Engineer's Handbook (Marks), 1930 edition, page 496.